United States Patent
Kim et al.

(10) Patent No.: US 10,097,675 B2
(45) Date of Patent: *Oct. 9, 2018

(54) MOBILE TERMINAL

(71) Applicant: LG ELECTRONICS INC., Seoul (KR)

(72) Inventors: Jaichul Kim, Anyang (KR); Ilgu Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,892

(22) Filed: Apr. 20, 2018

(65) Prior Publication Data

US 2018/0241855 A1    Aug. 23, 2018

Related U.S. Application Data

(63) Continuation of application No. 15/814,020, filed on Nov. 15, 2017, which is a continuation of application
(Continued)

(30) Foreign Application Priority Data

Jul. 2, 2012    (KR) .......................... 10-2012-0071872

(51) Int. Cl.
*H04M 1/00* (2006.01)
*H04M 1/02* (2006.01)
(Continued)

(52) U.S. Cl.
CPC ......... *H04M 1/0202* (2013.01); *H04M 1/236* (2013.01); *H04M 1/72519* (2013.01);
(Continued)

(58) Field of Classification Search
USPC ....................................... 455/575.3, 173, 567
See application file for complete search history.

(56) References Cited

U.S. PATENT DOCUMENTS

| | | | |
|---|---|---|---|
| 6,349,220 | B1 | 2/2002 | Prior et al. |
| 6,415,165 | B1 | 7/2002 | Ishigami |

(Continued)

FOREIGN PATENT DOCUMENTS

| | | |
|---|---|---|
| CN | 1496185 A | 5/2004 |
| CN | 101529545 A | 9/2009 |

(Continued)

OTHER PUBLICATIONS

"Motorola Atrix 4G Fact Sheet", Wikipedia, http://en.wikipedia.org/wiki/Motorola_Atrix_4G, last accessed Jun. 18, 2014, 7 pages.

(Continued)

*Primary Examiner* — Ganiyu A Hanidu
(74) *Attorney, Agent, or Firm* — Birch, Stewart, Kolasch & Birch, LLP

(57) ABSTRACT

A mobile terminal including a bar-type terminal body having a front side and a rear side; a mobile communication module transmitting and receiving a wireless signal; a touch screen disposed at the front side of the bar-type terminal body, the touch screen including a display module for displaying information and a front touch sensor for sensing a front touch input; a battery disposed in the bar-type terminal body; a cover disposed at the rear side of the bar-type terminal body and covering the battery, the cover having a first through hole and a second through hole; a front camera disposed at the front side of the bar-type terminal body; a rear camera disposed in the first through hole of the cover at the rear side of the bar-type terminal body; a rear input unit provided at the rear side of the bar-type terminal body, the
(Continued)

rear input unit including a button member disposed at the second through hole of the cover and a rear touch sensor for sensing a rear touch input applied to the button member; one or more processors; and a memory storing one or more programs configured to be executed by the one or more processors. Further, the front side of the bar-type terminal body is absent any manipulation button for inputting a control command except for the touch screen; wherein a position of the rear input unit is overlapped with a position of the touch screen and is disposed laterally between the rear camera and the battery; wherein in response to receiving the rear touch input via the rear input unit, the one or more processors process the rear touch input as a control command for different functions according to information output to the touch screen; wherein a first function of the different functions releases a locked state of the mobile terminal in response to a first rear touch input applied to the rear touch sensor in a first state that a lock screen is displayed on the touch screen; wherein a second function of the different functions connects an incoming call in response to a second rear touch input applied to the rear touch sensor in a second state that the incoming call is received on the mobile terminal; and wherein a third function of the different functions captures an image through at least one of the front camera and the rear camera in response to a third rear touch input applied to the rear touch sensor in a third state that a camera preview is displayed on the touch screen.

30 Claims, 20 Drawing Sheets

Related U.S. Application Data

No. 15/405,967, filed on Jan. 13, 2017, now Pat. No. 9,854,073, which is a continuation of application No. 13/739,885, filed on Jan. 11, 2013, now Pat. No. 9,578,155.

(51) Int. Cl.
H04M 1/725 (2006.01)
H04M 1/23 (2006.01)
(52) U.S. Cl.
CPC ..... H04M 2001/0204 (2013.01); H04M 2201/38 (2013.01); H04M 2250/22 (2013.01); H04M 2250/52 (2013.01)

(56) References Cited

U.S. PATENT DOCUMENTS

| | | | |
|---|---|---|---|
| 6,681,124 | B2 | 1/2004 | Prior et al. |
| 6,944,472 | B1 | 9/2005 | Ishigami |
| 6,965,783 | B2 | 11/2005 | Pirkola et al. |
| 7,369,119 | B2 | 5/2008 | Davani et al. |
| 7,551,945 | B2 | 6/2009 | Okada et al. |
| 7,800,592 | B2 | 9/2010 | Kerr et al. |
| 7,957,770 | B2 | 6/2011 | An et al. |
| 8,005,506 | B2 | 8/2011 | Choi et al. |
| 2001/0041598 | A1 | 11/2001 | Yoshino et al. |
| 2002/0191029 | A1 | 12/2002 | Gillespie et al. |
| 2006/0050168 | A1 | 5/2006 | Okada et al. |
| 2007/0150826 | A1 | 6/2007 | Anzures et al. |
| 2008/0090015 | A1 | 4/2008 | Lim et al. |
| 2008/0172634 | A1 | 7/2008 | Choi et al. |
| 2008/0192019 | A1 | 8/2008 | Lee et al. |
| 2008/0220821 | A1 | 9/2008 | Okuzako et al. |
| 2008/0271980 | A1 | 11/2008 | Seo |
| 2009/0015703 | A1 | 1/2009 | Kim et al. |
| 2009/0124308 | A1* | 5/2009 | Lee .......... G06F 1/1626 455/575.3 |
| 2009/0160802 | A1* | 6/2009 | Yasumi ........... G06F 3/04883 345/173 |
| 2009/0167696 | A1 | 7/2009 | Griffin |
| 2009/0179854 | A1 | 7/2009 | Weber et al. |
| 2009/0229892 | A1 | 9/2009 | Fisher et al. |
| 2009/0298537 | A1 | 12/2009 | Choi |
| 2009/0323262 | A1 | 12/2009 | Arita |
| 2010/0040268 | A1* | 2/2010 | Boeing ............... A61B 6/482 382/128 |
| 2010/0048268 | A1 | 2/2010 | O'Neill et al. |
| 2010/0053083 | A1 | 3/2010 | Hwang |
| 2010/0053861 | A1* | 3/2010 | Kim .............. H04M 1/22 361/679.01 |
| 2010/0110010 | A1 | 5/2010 | Choi |
| 2010/0164871 | A1 | 7/2010 | Shigeta et al. |
| 2010/0164904 | A1 | 7/2010 | Kim et al. |
| 2010/0299634 | A1 | 11/2010 | Cho et al. |
| 2010/0331054 | A1* | 12/2010 | Roberts ............. H04M 1/57 455/567 |
| 2011/0108707 | A1 | 5/2011 | Cui et al. |
| 2011/0273819 | A1 | 11/2011 | Sokola et al. |
| 2011/0285553 | A1 | 11/2011 | Maenpaa et al. |
| 2012/0227006 | A1 | 9/2012 | Amm |
| 2013/0069883 | A1 | 3/2013 | Oga |
| 2013/0117692 | A1 | 5/2013 | Padmanabhan et al. |

FOREIGN PATENT DOCUMENTS

| | | |
|---|---|---|
| CN | 101641663 A | 2/2010 |
| CN | 201450523 U | 5/2010 |
| CN | 101984384 A | 3/2011 |
| EP | 1 387 554 A1 | 2/2004 |
| JP | 11-317799 A | 11/1999 |
| JP | 2009-129435 A | 6/2009 |
| JP | 2012-242851 A | 12/2012 |
| JP | 2013-81427 | 5/2013 |
| KR | 10-2005-0028638 A | 3/2005 |
| KR | 10-2006-0080060 A | 7/2006 |
| KR | 10-2008-0102503 A | 11/2008 |
| KR | 10-2009-0026977 A | 3/2009 |
| KR | 10-2009-0076303 A | 7/2009 |
| KR | 10-2010-0086639 A | 8/2010 |
| KR | 10-2010-0100459 A | 9/2010 |
| KR | 10-2010-0104171 A | 9/2010 |
| KR | 10-0983902 B1 | 9/2010 |
| KR | 20-0450989 Y1 | 11/2010 |
| KR | 10-2010-0127929 A | 12/2010 |
| KR | 20-2011-0001788 U | 2/2011 |
| KR | 10-2011-0092669 A | 8/2011 |
| KR | 10-1085239 B1 | 11/2011 |
| KR | 10-2011-0139107 | 12/2011 |
| KR | 10-1106278 B1 | 1/2012 |
| KR | 10-1107422 B1 | 1/2012 |
| KR | 10-2012-0045697 A | 5/2012 |
| KR | 10-2012-0068259 A | 6/2012 |
| KR | 10-2012-0131906 A | 12/2012 |
| KR | 10-2012-0138983 A | 12/2012 |
| KR | 10-1227949 B1 | 1/2013 |
| KR | 10-2013-0025555 A | 3/2013 |
| KR | 10-2013-0045111 A | 5/2013 |
| WO | WO 2008/054955 A2 | 5/2008 |

OTHER PUBLICATIONS

"Motorola Atrix 4G Teardown," https://www.ifixit.com/teardown/motorola+Atrix+4G+teardown/4964, (7 pages).
"User Guide, Sonim XP3300 Force," http://xphone24.com/manual-user-guide/Sonim_XP3300_Force_EN.pdf (78 pages).
"User's Guide, Motorola Atrix HD," https://www.motorola.com/moto_care/manuals/ATRIX_HD_UG_JB.pdf (106 pages).
http://web.archive.org/web20110315095512/http://www.sparkfun.com/products/10439 omten TSD1265 (LED Tactile Button.pdf.

* cited by examiner

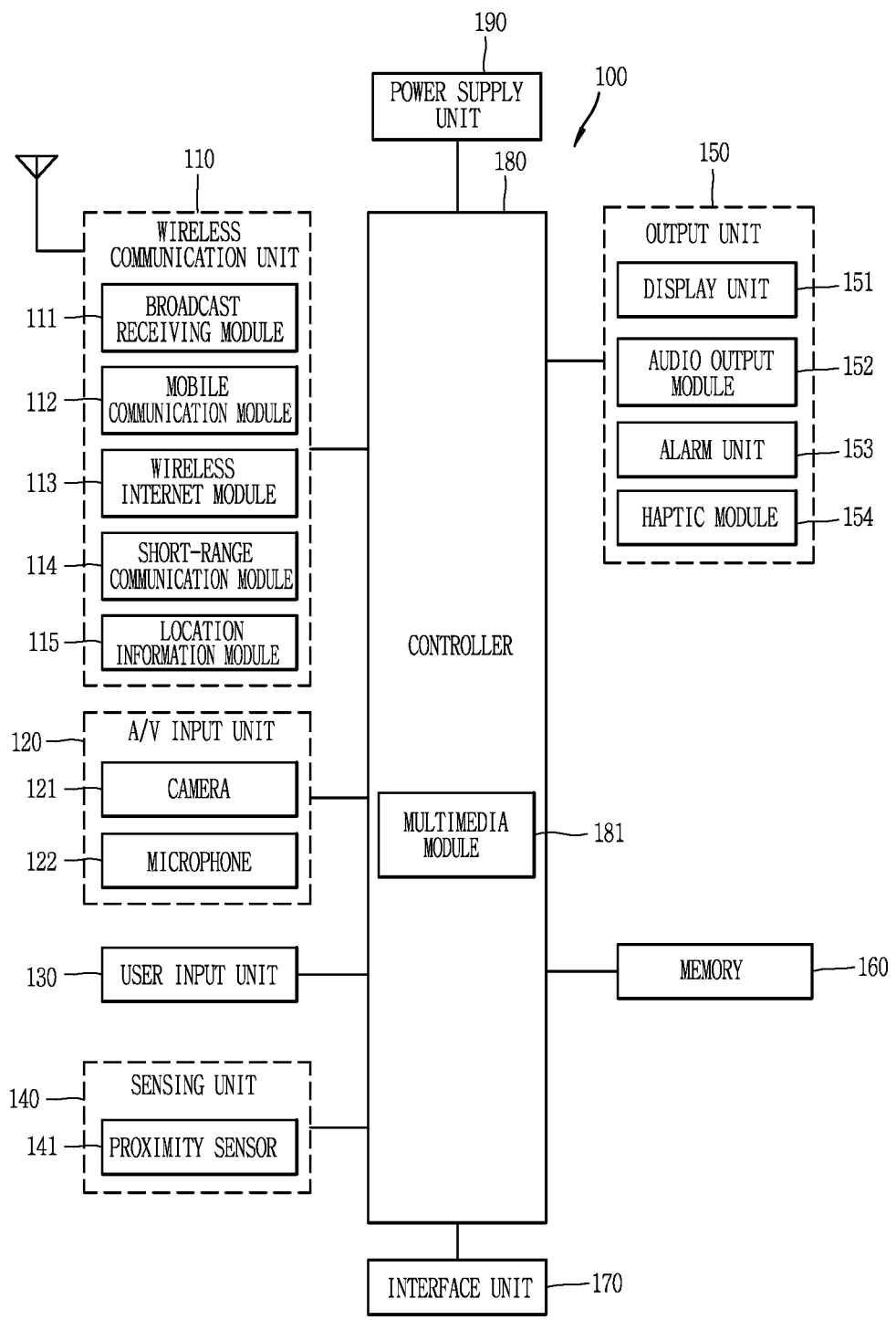

MOBILE TERMINAL

CROSS-REFERENCE TO RELATED APPLICATION

This application is a Continuation of co-pending application Ser. No. 15/814,020 filed Nov. 15, 2017, which is a Continuation of application Ser. No. 15/405,967, filed on Jan. 13, 2017 (now U.S. Pat. No. 9,854,073), which is a Continuation of application Ser. No. 13/739,885, filed on Jan. 11, 2013 (now U.S. Pat. No. 9,578,155), which claims priority under 35 U.S.C. § 119(a) to Application No. 10-2012-0071872, filed in Republic of Korea on Jul. 2, 2012, all of which are hereby expressly incorporated by reference into the present application.

BACKGROUND OF THE INVENTION

1. Field of the Invention

This specification relates to a mobile terminal having a user input unit capable of receiving a control command.

2. Background of the Invention

Terminals may be divided into mobile/portable terminals and stationary terminals according to their mobility. Also, the mobile terminals may be categorized into a handheld terminal and a vehicle mount terminal according to whether it is directly portable by a user.

As it becomes multifunctional, the mobile terminal can be allowed to capture still images or moving images, play music or video files, play games, receive broadcast and the like, so as to be implemented as a multimedia player.

Various new attempts have been made for the multimedia devices by hardware or software in order to implement such complicated functions. For example, a user interface environment is provided in order for users to easily and conveniently retrieve or select functions.

Furthermore, as a mobile terminal is considered as a personal belonging for expressing one's own personality, various design forms are required. The design forms include structural changes and improvements for the user to more conveniently use the mobile terminal. As one of the structural changes and improvements, a manipulation unit may be taken into account.

For instance, a manipulation unit is configured as a type of a touch screen or separately provided as other types, to receive a user input. However, the touch screen type has a problem that a target to be manipulated is obscured by a finger or a stylus pen. To obviate the problem, a manipulation unit is separately disposed on a front or side surface of the terminal, but this may mess up a slim and simple design of the terminal. Therefore, an input method with a new structure for overcoming the problem may be considered.

SUMMARY OF THE INVENTION

Therefore, an aspect of the detailed description is to provide a mobile terminal enabling a new type of user input different from the related art.

Another aspect of the detailed description is to provide a mobile terminal capable of minimizing the number of manipulation units, exposed to outside of the terminal, with preventing the manipulation units from obscuring a touch screen.

To achieve these and other advantages and in accordance with the purpose of this specification, as embodied and broadly described herein, there is provided a mobile terminal including a terminal body having a front surface and a rear surface, a display module disposed on the front surface and configured to display visual information, and a rear input unit disposed on the rear surface and configured to sense an input of a control command. The rear input unit may include a button member externally located on the rear surface, a first sensing unit disposed to overlap the button member and configured to sense a push input applied onto the button member, and a second sensing unit disposed to overlap the button member and configured to sense a touch input applied onto the button member.

In accordance with another exemplary embodiment, there is provided a mobile terminal including a terminal body having a front surface and a rear surface, a rear input unit disposed on the rear surface and configured to sense an input of a control command, a controller configured to process an input manipulation applied onto the rear input unit as a control command for a different function according to an operating mode of the terminal, and a display module disposed on the front surface and configured to display visual information. The display module may output information indicating a function associated with a control command received by the rear input unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram of a mobile terminal in accordance with one exemplary embodiment;

DETAILED DESCRIPTION OF THE INVENTION

Figure 2A:
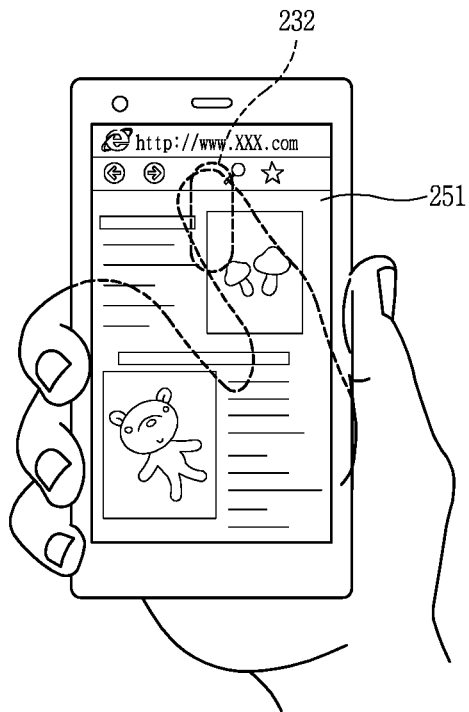
FIGS. 2A to 2C are conceptual views showing operations implemented according to the present disclosure.

Hereinafter, a mobile terminal associated with the present disclosure will be described in more detail with reference to the accompanying drawings. Hereinafter, suffixes "module" and "unit or portion" for components used herein in description are merely provided only for facilitation of preparing this specification, and thus they are not granted a specific meaning or function.

A mobile terminal disclosed herein may include a laptop computer, a tablet PC, a mobile phone, a smart phone, a digital broadcast terminal, a personal digital assistant (PDA), a portable multimedia player (PMP), a navigator, and the like.

FIG. 1 is a block diagram of a mobile terminal in accordance with one exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 can be, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LED (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

In embodiments where the display unit 151 and a touch sensitive sensor (referred to as a touch sensor) have an interlayer structure, the structure may be referred to as a touch screen. The display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to the perpendicular projection of the location of the onto the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image. The power supply unit 190 provides power required by various components under the control of the controller 180.

The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2B:
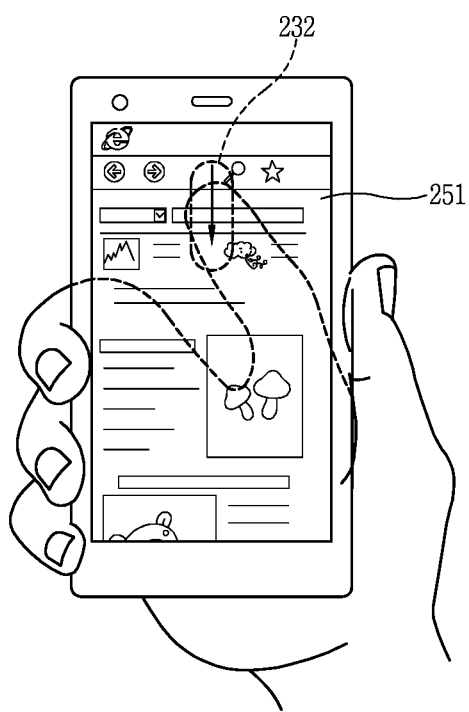
Figure 2C:
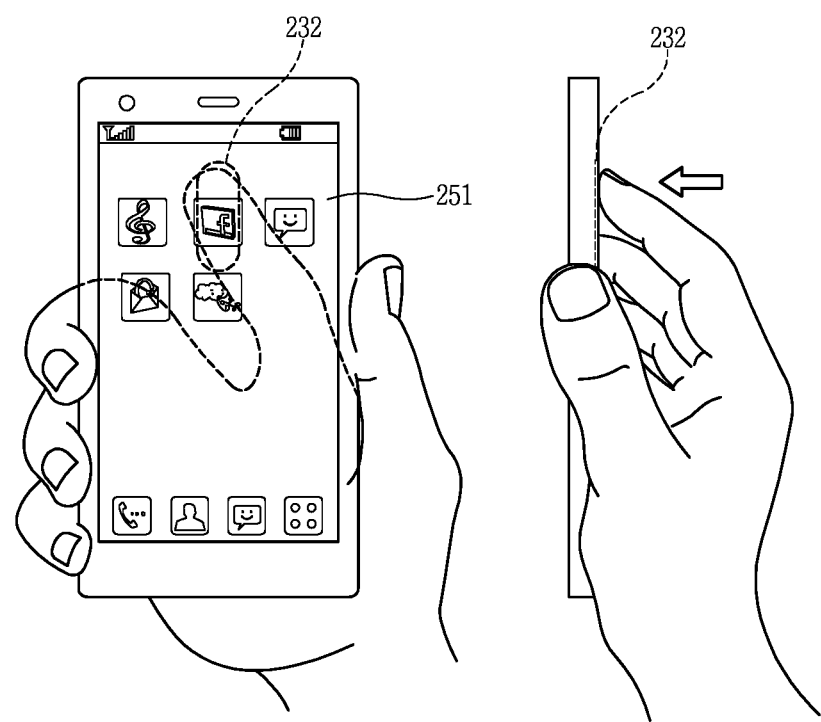

FIGS. 2A to 2C are conceptual views showing operations implemented according to the present disclosure.

As shown in FIG. 2A, the terminal may include a display module 251 disposed on one surface of the terminal body, for example, a front surface thereof. The display module 251 may have a touch sensor for sensing a touch input. Visual information output on the display module 251 may be implemented in forms of images, text, icons and the like. As shown in the drawings, a webpage containing them may be output on the display module 251.

Referring to FIG. 2B, another surface of the terminal body, for example, a rear surface is shown having a rear input unit 232. The rear input unit 232 may receive a control command for the webpage. In more detail, when dragging or flicking is applied onto the rear input unit 232, the webpage may be scrolled.

As another example, a user may scroll the rear input unit 232 to move a cursor or pointer located on an object, for example, an icon or the like, displayed on the display module 251. In addition, when the user moves a finger across the rear input unit 232, the movement of the finger is visually tracked on the display module 251. This function may be useful for edition of an image displayed on the display module 251.

Referring to FIG. 2C, when a user clicks the rear input unit 232 in a webpage mode, namely, applies a push input, a webpage on the display module 251 may be shifted into a home screen page.

Here, the home screen page may also be called an idle screen. In an idle state of the terminal, the home screen page may be output on the display module 251. In more detail, the home screen page may display icons or widgets of applications installed in the mobile terminal. Also, a plurality of home screen pages may be provided depending on a user selection or the number of applications installed in the terminal.

As such, a control command to come back into the home screen page may be given by a separate home key. However, in the present disclosure, the rear input unit may serve as the home key without the separate home key.

Consequently, the rear input unit of the mobile terminal may be allowed to receive both touch and push inputs, and in some cases, serve as the home key of the mobile terminal as well as a touch sensor for the display module 251.

Figure 3A:
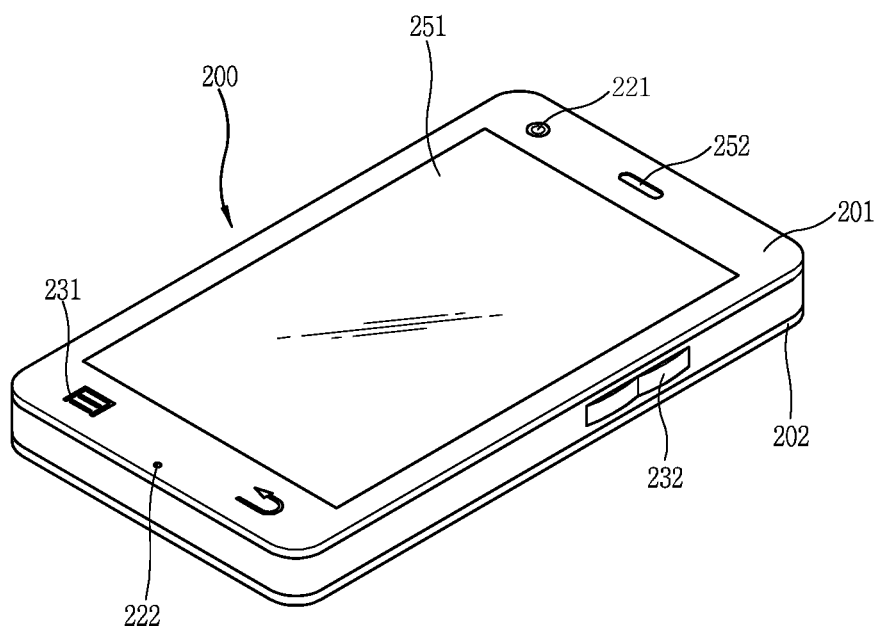
FIG. 3A is a front perspective view of a mobile terminal in accordance with one exemplary embodiment.
Figure 3B:
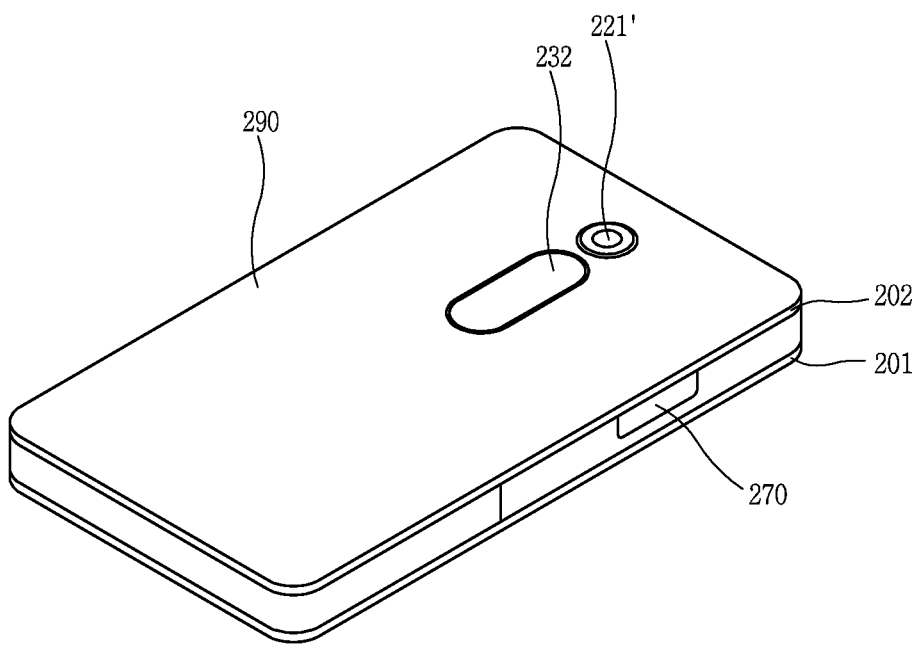
FIG. 3B is a rear perspective view of the mobile terminal shown in FIG. 3A.

Hereinafter, hardware configuration of the terminal performing the operations shown in FIGS. 2A to 2C will be described in more detail. FIG. 3A is a front perspective view of a mobile terminal in accordance with one exemplary embodiment, and FIG. 3B is a rear perspective view of the mobile terminal shown in FIG. 3A.

A mobile terminal 200 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

A body may include a case (or referred to as casing, housing, cover, etc.) defining an appearance of the mobile terminal 200. In this exemplary embodiment, the case may be divided into a front case 201 and a rear case 202. A space formed between the front and rear cases 201 and 202 may accommodate various electronic components. At least one intermediate case may further be disposed between the front and the rear cases 201 and 202.

Such cases may be injected using a synthetic resin or be formed of a metal, such as stainless steel (STS), titanium (Ti) or the like.

The terminal body is shown having a display module 251, an audio output module 252, a camera 221 and the like provided on the front case 201. Also, an interface unit 270, and the like may be disposed on side surfaces of the front case 201 and the rear case 202.

The display module 251 may occupy most of a principal surface of the front case 201. That is, the display module 251 may be disposed on a front surface of the terminal and display visual information. The audio output module 252 and the camera 221 may be disposed near one of both end portions of the display module 251, and a front input unit 231 and the microphone 222 may be disposed near the other end portion of the display module 251.

The front input unit 231 is one example of the user input unit 130 (see FIG. 1) and may include a plurality of manipulation units. The manipulation units may be commonly designated as a manipulating portion, and employ any method if it is implemented in a tactile manner allowing the user to perform manipulation with a tactile feeling. In this exemplary embodiment, the front input unit 231 may be implemented as a touch key. Also, the display module 251 may form a touch screen together with a touch sensor. In this structure, the touch screen may serve as a user input unit. Accordingly, the front surface of the mobile terminal may be implemented in a form factor that a push key is not disposed below the touch screen. Here, without being limited to this structure, the present disclosure may be implemented in a form factor that the front input unit 231 includes only the push key or a form factor that the front input unit is not provided on the front of the terminal.

Referring to FIG. 3B, a rear surface of the terminal body (namely, the rear case 202) is shown further having a camera module 221'. The camera module 221' faces a direction which is opposite to a direction faced by the camera 221 (see FIG. 3A), and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed in the terminal body to be rotatable or popped up.

A flash and a mirror may additionally be disposed adjacent to the camera 221'. The flash operates in conjunction with the camera 221' when taking a picture using the camera 221'. The mirror can cooperate with the camera 221' to allow a user to photograph himself in a self-portrait mode.

An audio output module may further be disposed at a rear face of the terminal body. The rear audio output module can cooperate with the audio output module 252 (see FIG. 32A) to provide stereo output. Also, the audio output module 252' may be configured to operate as a speakerphone.

A power supply unit 290 for supplying power to the mobile terminal 200 may be mounted in the terminal body. The power supply unit 290 may be mounted in the terminal body or detachably coupled directly onto the outside of the terminal body.

As shown in the drawings, the rear input unit 232 may be disposed on the rear face of the terminal body. The rear input unit 232, for example, may be located below the camera module 221'.

The rear input unit 232 may be manipulated by a user to input a command for controlling an operation of the mobile terminal 200, and set to allow inputting of various contents. For example, the rear input unit 232 may allow a user to input commands, such as START, END, SCROLL or the like, volume adjustment of sounds output from the audio output module 252, or conversion of the display module 251 into a touch recognition mode, or the like.

Figure 4:
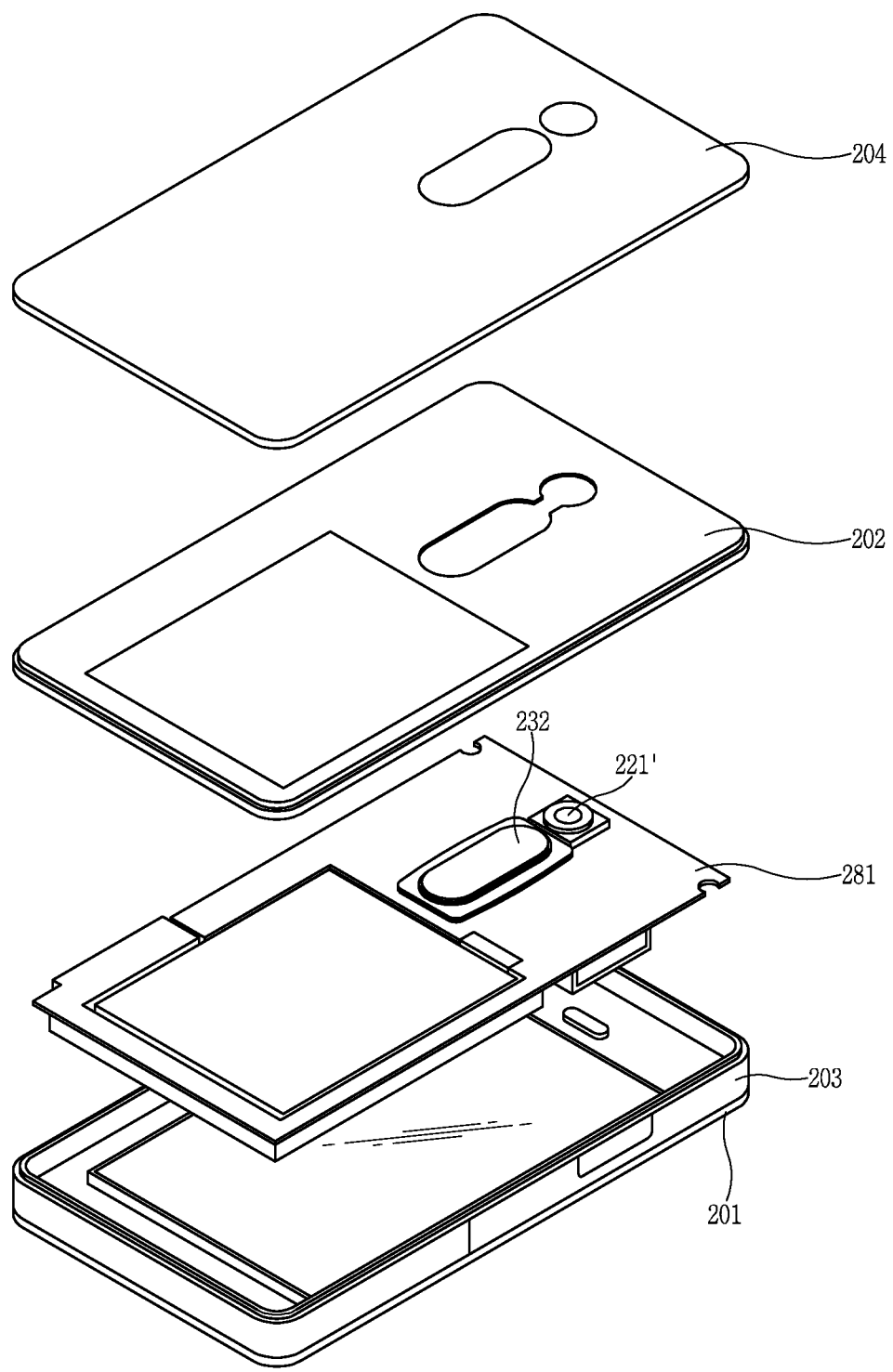
FIG. 4 is a disassembled view of the mobile terminal of FIG. 3B.
Figure 5:
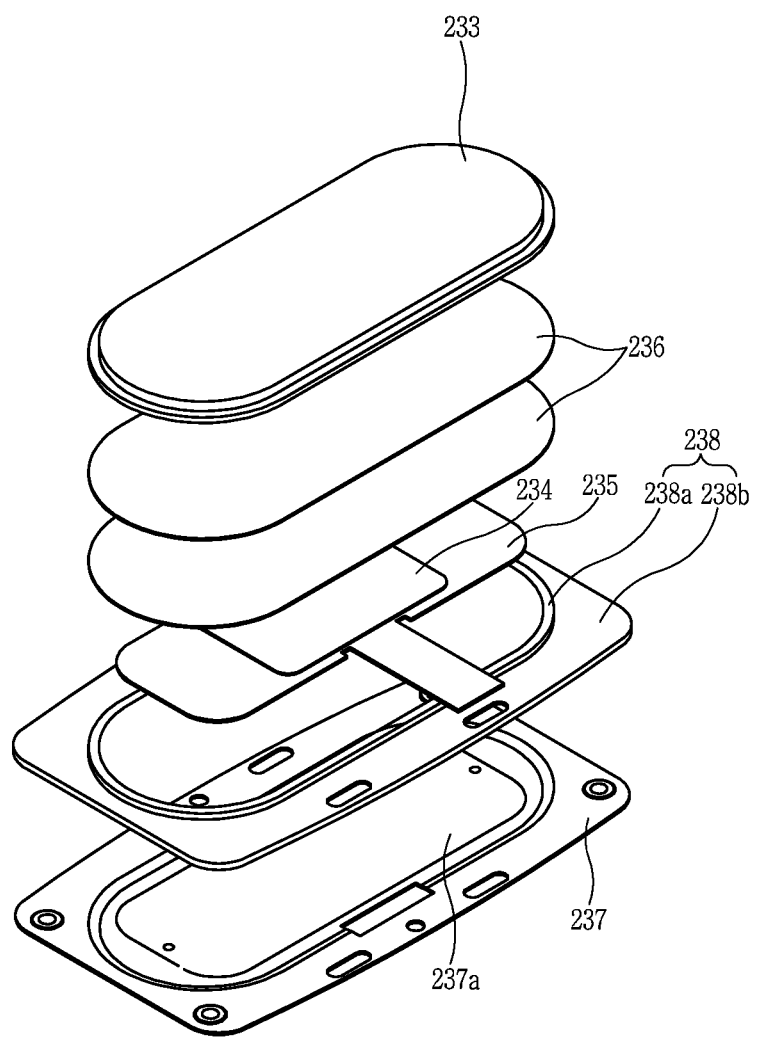
FIG. 5 is a detailed disassembled view of a rear input unit of FIG. 4.
Figure 6:
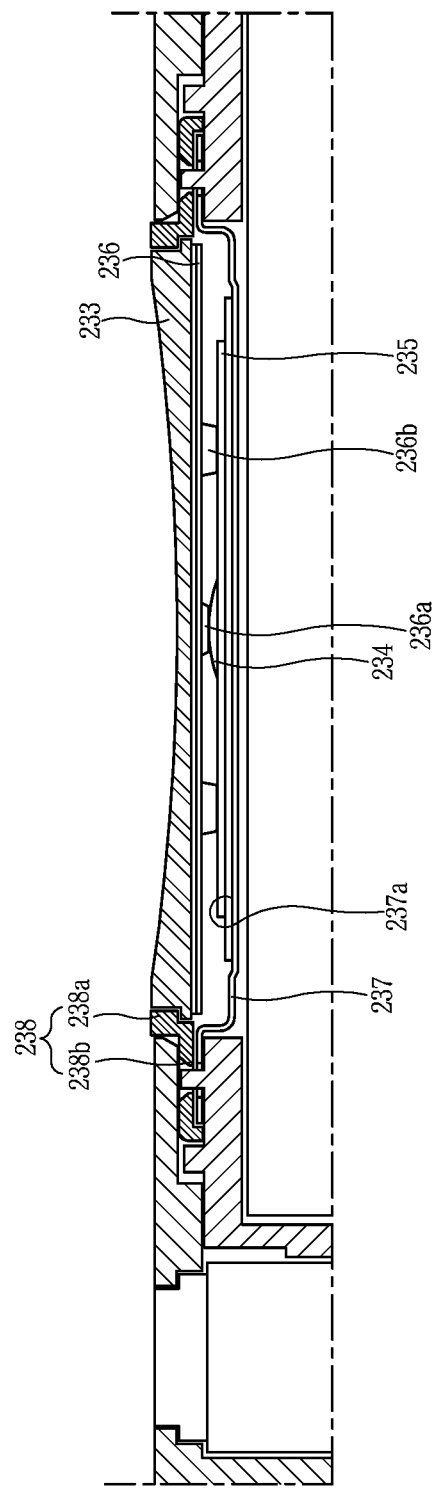
FIG. 6 is a sectional view taken along the line VI-VI of FIG. 3B.

The rear input unit 232 may be implemented as a new type of manipulation unit. Hereinafter, the configuration of the rear input unit 232 will be described in more detail. FIG. 4 is a disassembled view of the mobile terminal of FIG. 3B, FIG. 5 is a detailed disassembled view of a rear input unit of FIG. 4, and FIG. 6 is a sectional view taken along the line VI-VI of FIG. 3B.

First of all, surroundings of the rear input unit 232 will be described with reference to those drawings. A printed circuit board 281 may be mounted in the terminal body. The printed circuit board 281, for example, may be mounted to the front case 201 or the rear case 202, or mounted to a separate structure 203. The separate structure may form an intermediate case. Hereinafter, description will be given on the basis of the front or rear case 201 or 202 being separately formed, but the present invention may not be limited to this. Alternatively, the cases 201, 202 and 203 may all be integrally formed.

The printed circuit board 281 may be configured as one example of the controller 180 (see FIG. 1) for control of various functions of the mobile terminal. The printed circuit board 281 may alternatively be provided in plurality, so as to perform the functions of the controller 180 by combination thereof. To perform such functions, various types of electronic devices may be mounted to the printed circuit board 281.

The printed circuit board 281 may be electrically connected to an antenna (not shown), and process a wireless signal corresponding to a radio electromagnetic wave transmitted or received via the antenna. The antenna may be disposed between the structure 203 and the printed circuit board 281 to usually allow for transmission and reception of the wireless signal via the rear case 202.

As shown in the drawings, the printed circuit board 281 may be electrically connected to the camera module 221'. Also, the rear case 202 (or a battery cover 204) may have a through hole, and the camera module 221' may be disposed to be externally exposed through the through hole. The camera module 221' may be disposed at an opposite side to the antenna with a battery interposed therebetween, capturing an external image through the rear surface of the terminal.

Hereinafter, the rear input unit 232 will be described again. The rear input unit 232 may be disposed between the camera module 221' and the battery. The position of the rear input unit 232 may overlap a position of the front display module 251 (see FIG. 3A). This may acquire an advantage in that an input device is disposed on the rear surface of the display module 251. Thus, for example the user is able to easily operate the terminal with one hand whilst holding the terminal with the same hand. In addition, the screen is not obscured by operation of the input device. Further, input keys on the side of the terminal may not be necessary.

Referring to FIG. 5, the rear input unit 232 may include a button member 233, a first sensing unit 234, and a second sensing unit 235.

The button member 233 may be externally exposed through the rear surface of the terminal, and be directly subject to a user's manipulation. The button member 233 may include an externally exposed concave surface and a planar surface formed opposite to the concave surface. Accordingly, a new type of input device which allows for dragging applied along the concave surface may be implemented.

In an alternative embodiment, the button member 233 may include an externally exposed convex surface and a planar surface formed opposite to the convex surface. In such an embodiment a new type of input device which allows for dragging applied along the convex surface may be implemented.

The first sensing unit 234 may be disposed to overlap the button member 233, and be configured to sense a push input applied onto the button member 233. As one example, the first sensing unit 234 may be implemented as, but not limited to, a dome switch. Here, the first sensing unit 234 may alternatively be implemented as another type of input device, such as a piezoelectric element.

The curved surface of the button member 233 exposed to the outside may be formed such that a border area protrudes rather than a central area. The first sensing unit 234 may be disposed to face the central area. This may result in implementation of a structure that further facilitates the push input.

The second sensing unit 235 may be disposed to overlap the button member 233, to sense a touch input applied onto the button member 233. As one example, the seconding unit 235 may be a touchpad, a touch film, a touch sensor, and the like.

Referring to FIGS. 5 and 6, the first sensing unit 234 may be interposed between the second sensing unit 235 and the button member 233. An intermediate member 236, which is made of rubber, may be disposed between the button member 233 and the second sensing unit 235. That is, the first sensing unit 234 may be located between the intermediate member 236 and the second sensing unit 235.

Also, a touch input applied onto the button member 233 may be transferred to the second sensing unit 235 via the intermediate member 236. One area of the second sensing unit 235 may be obscured by the first sensing unit 234. A touch input applied onto the one area may be transferred to the second sensing unit 235 via the first sensing unit 234, and a touch input applied onto other areas except for the one area may be transferred to the second sensing unit 235 only via the intermediate member 236.

For example, the second sensing unit 235 may be a static pressure type touch sensor, and the first sensing unit 234 may be a dome switch which covers a part of the static pressure type touch sensor. Here, the dome switch may cover a part of the static pressure type touch sensor, and accordingly other part of the static pressure type touch sensor may directly face the intermediate member 236. When a user applies a touch input onto a portion of the button member corresponding to the dome switch, the touch input may be applied in the order of button member-intermediate member-dome switch-touch sensor. When the user applies a touch input onto the non-overlapped portion of the button member with the dome switch, the touch input is applied in the order of button member-intermediate member-touch sensor.

In more detail, a plurality of manipulation protrusions 236*a* and 236*b* may be formed on one surface of the intermediate member 236. At least one (e.g., 236*a*) of the manipulation protrusions 236*a* and 236*b* may be disposed to press the first sensing unit 234, and the others (e.g., 236*b*) of the manipulation protrusions 236*a* and 236*b* may be disposed to press the second sensing unit 235.

For an effective touch input, the at least one 236*a* and the others 236*b* of the manipulation protrusions 236*a* and 236*b* may protrude from the one surface of the intermediate member 236 by different heights from each other. For example, for compensating for a height difference due to the first and second sensing units 234 and 235 being overlapped by each other, the manipulation protrusion 236*a* for pressing the first sensing unit 234 may be shorter than the manipulation protrusions 236*b* for pressing the second sensing unit 235.

As shown in the drawings, the rear case 202 of the terminal is shown having a support member 237 for supporting the rear input unit 232, especially, the first and second sensing units 234 and 235.

A receiving groove 237*a* for receiving the second sensing unit 235 therein may be formed at a central area of the support member 237. A border area of the support member 237 may be coupled to the rear case 202. The receiving groove 237 may have a through hole through which the printed circuit board and the sensing units may be connected to each other.

In addition, a guide member 238 for guiding movement of the button member 233 may be mounted onto a border area of the support member 237. The guide member 238 may include a guide portion 238*a* in which the button member 233 is inserted, and an extending portion 238*b* extending from the guide portion 238*a* in a direction orthogonal to a moving direction of the button member 233 so as to be coupled to the support member 237. As shown in the drawings, the extending portion 238*b*, together with the support member 237, may be obscured by a battery cover 204, and the button member 233 and the guide portion 238*a* may be exposed to the outside via a through hole of the battery cover. Without being limited to the structure, a configuration that only the button member 233 is exposed through the through hole may alternatively be employed.

With the aforementioned structure, an input received at the rear input unit may be determined to be a touch type or a push type according to the overlapped structure of the sensing units or a position where a button is contacted.

Also, the rear input unit which allows for the touch and push inputs may be varied into several shapes. Hereinafter, an exemplary variation of the rear input unit will be described with reference to FIG. 7. In the variation to be explained hereinafter, the same or similar reference numerals to the previous embodiment will be given, and they will be understood by the first explanation.

Figure 7:
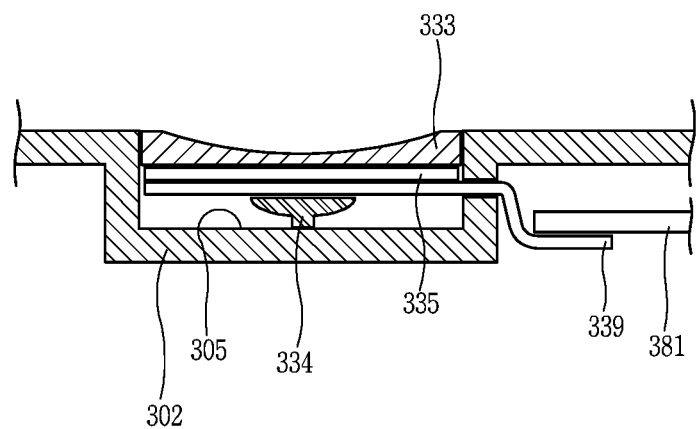
FIG. 7 is a sectional view of a rear input unit in accordance with another exemplary embodiment.

FIG. 7 is a sectional view of a rear input unit in accordance with another exemplary embodiment.

As shown in FIG. 7, a second sensing unit 335 may be disposed between a button member 333 and a first sensing unit 334. For example, they may be sequentially disposed in the order of button member-touch sensor-dome switch.

A flexible printed circuit board 339 may be disposed between the first and second sensing units 334 and 335.

Here, the touch sensor may have a structure that a touch pattern is formed on the flexible printed circuit board 339. Unlike the previous embodiment, the second sensing unit 335 may be a static pressure type touch sensor.

According to the mechanism of this variation, a push input for the first sensing unit 334 may always be performed after a touch input for the second sensing unit 335 is performed. Hence, the touch input may be sensed until a force applied onto the button member 333 reaches a preset value, and then the push input may be sensed after the force exceeds the preset value. Here, the preset value may be a force strong enough to switch the dome switch on.

As shown in FIG. 7, a recess 305 may be formed at a rear case 302, and the first and second sensing units 334 and 335 may be received in the recess 305 in an overlapped state. Here, the button member 333 may be formed to be movable along a side wall of the recess 305. With this structure, it may be advantageous that any component for moving the button member 333 is not required.

The rear input unit having the configuration may provide new types of user interfaces as well as the operations shown in FIGS. 2A to 2C. Hereinafter, the user interfaces will be described.

FIGS. 8A to 14B are conceptual views showing user interfaces implemented by the terminal of FIG. 3B.

Figure 8A:
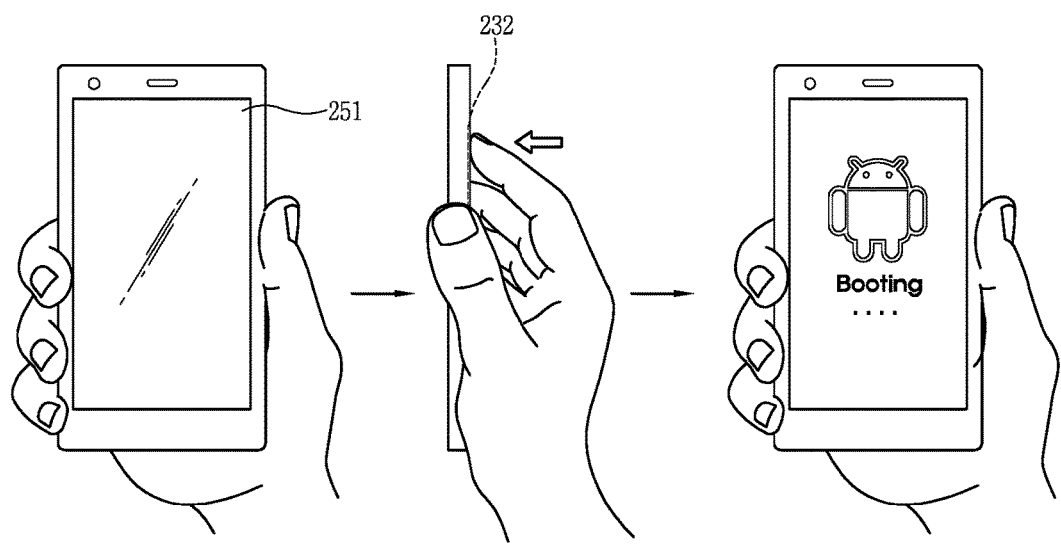
FIGS. 8A to 14B are conceptual views showing operations implemented in the terminal of FIG. 3B in accordance with another exemplary embodiment.
Figure 8B:
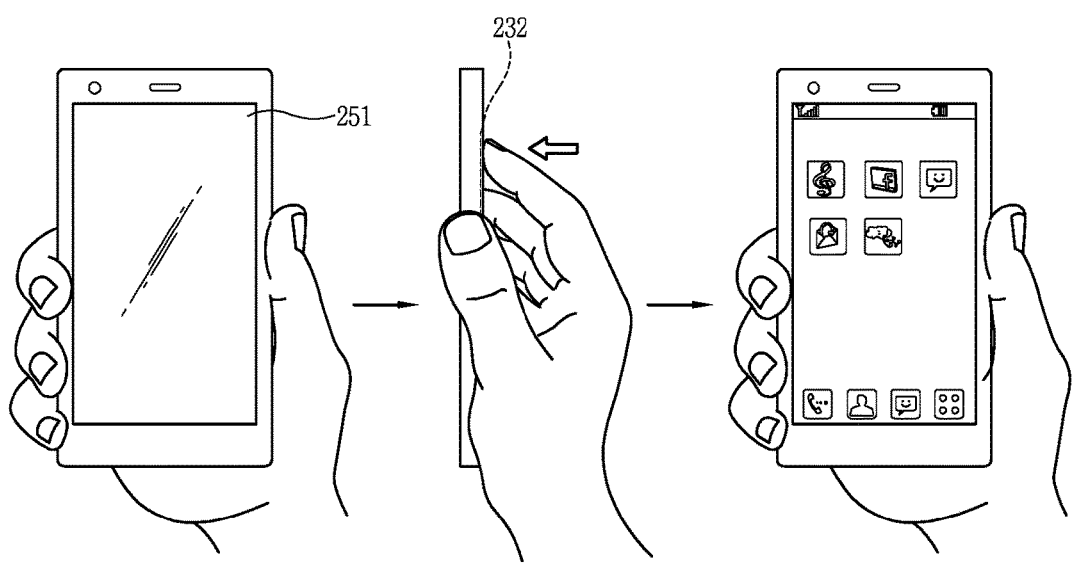
Figure 8C:
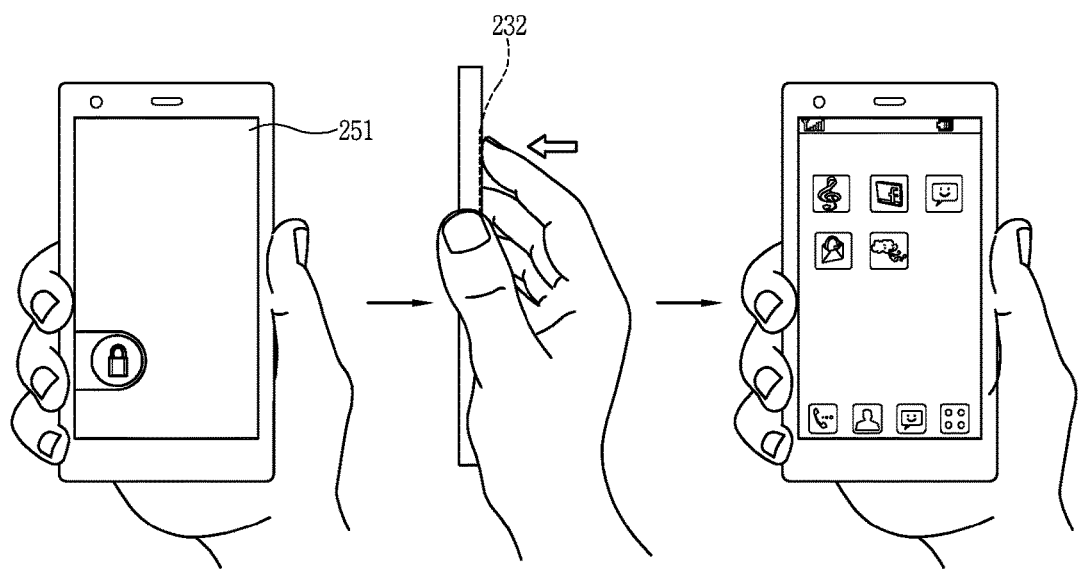

FIGS. 8A to 8C show user interfaces associated with the control of activation of the second sensing unit in response to an input applied to the first sensing unit.

For example, whether or not to activate the second sensing unit may be decided depending on a push input for the first sensing unit. In more detail, the push input may be defined as an input for an ON/OFF command with respect to a terminal body. That is, when a push input is applied onto the button member in a power-off state of the terminal, the terminal may be powered on (see FIG. 8A). The second sensing unit may be activated only after the terminal is turned on.

As another example, the push input may be defined as an input for an ON/OFF command with respect to a display module. In a deactivated state of the display module, the second sensing unit may not sense a touch input. The display module may be activated when the push input is applied onto the first sensing unit (see FIG. 8B). The second sensing unit may be activated only after the display module is activated. Those operations may result in prevention of erroneous manipulation for the terminal. This can prevent functions and applications of a mobile terminal, which generally allows for touch inputs, from being activated or deactivated due to a control command which is not intended by a user.

As another example, the push input may be an input associated with unlocking of a locked state. States of a mobile terminal may be divided into 'locked state' and 'unlocked state' according to whether or not a user is allowed to input a control command, and the locked state and the unlocked state may be converted in response to the push input. Here, the locked state may be a state of restricting a user from inputting a control command for applications installed in the terminal.

Consequently, the locked state may be released in response to a push input applied onto the first sensing unit (sec FIG. 8C). Once the locked state is released, the touch input on the display module and the touch input on the rear input unit may all be enabled.

Figure 9:
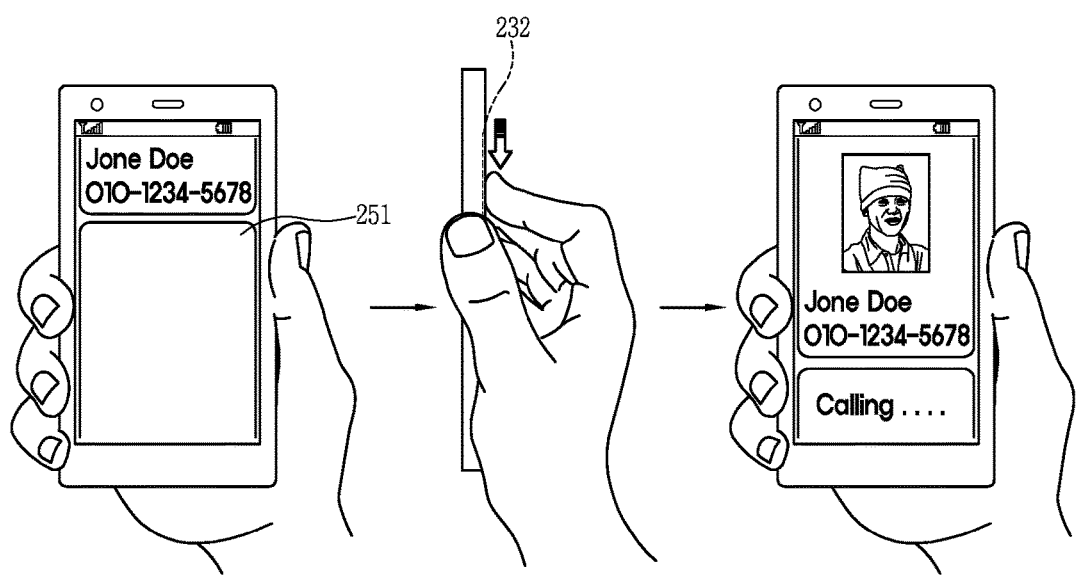

FIG. 9 shows a gesture of performing a function of a call button using the button member.

The second sensing unit may sense dragging applied onto the button member and accordingly the button member may take the place of a call button. That is, while vibration, a connection sound or a pop-up window is output to indicate that a call is incoming, when the button member is dragged, the terminal may connect the incoming call.

Here, the front face of the terminal may not have any manipulation unit for inputting a control command except for the display module. That is, the front input unit 231 (see FIG. 3) may not be disposed on the front face of the terminal, and this can enable the implementation of a large screen.

In addition, the display module may output information related to a connected callee, for example, name, phone number, photo and the like, but may not output a virtual button for connecting the call. This enables the display of more information associated with the callee.

Figure 10A:
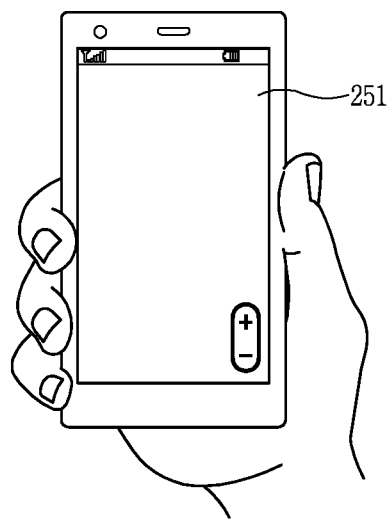
Figure 10B:
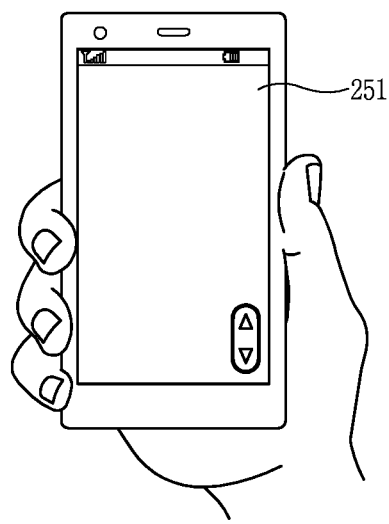
Figure 10C:
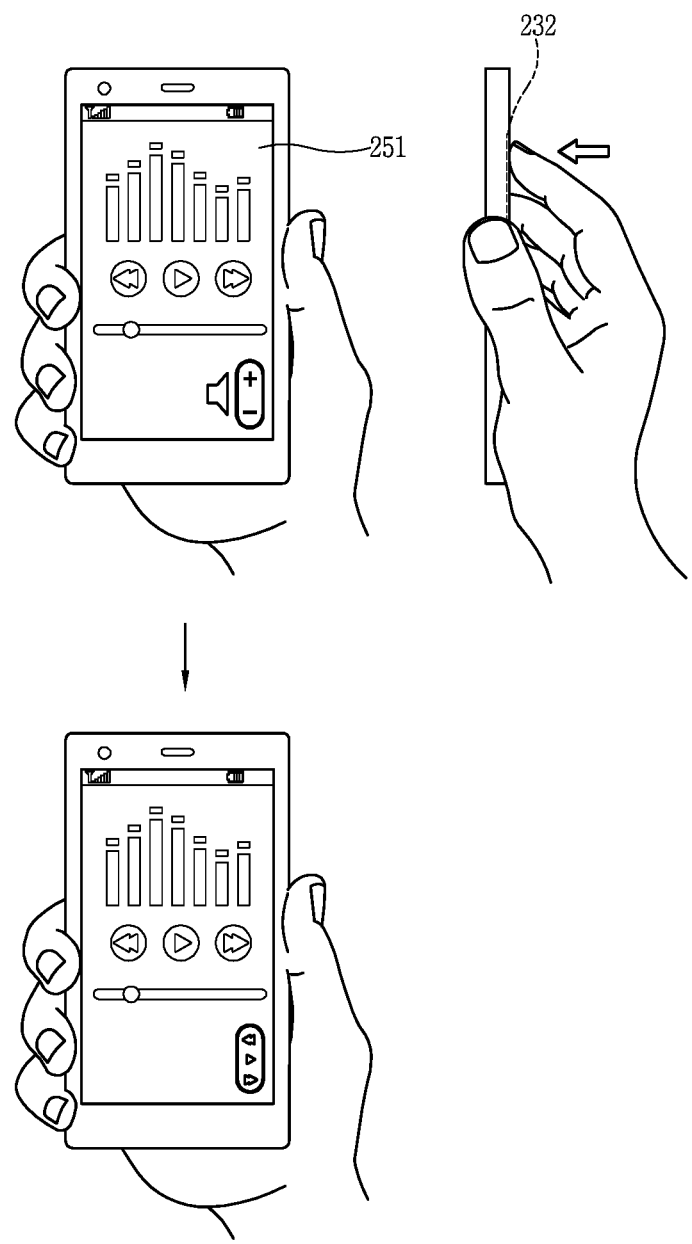

FIGS. 10A to 10C show user interfaces that information related to a rear input unit is output on a display module.

As shown in FIGS. 10A to 10C, a controller for controlling functions of the terminal may process input manipulations applied onto the rear input unit as control commands for different functions according to operating modes of the terminal. For example, an input onto the rear input unit may be associated with a volume adjustment or a conversion of a reproduction file in a reproducing mode of music or video, or a scroll manipulation in an Internet mode.

Here, the display module may output information indicating which function is being sensed by the rear input unit. In more detail, an image corresponding to an external appearance of the button member (i.e., button image) may be output on the display module, and an icon associated with the information may be displayed within the image.

The displayed icon may be formed as a pair. For example, upon reception of an input related to an UP/DOWN operation (for example, volume, zooming, etc.), the pair of icons may be '+' and '−' (see FIG. 10A), and they may be located on both ends of the button image in a lengthwise direction of the button image (or the terminal).

For example, in ease of a volume adjustment, when the button member is dragged, the volume may be turned up or down. Also, the volume may be turned up when one of both ends of the button member is touched, and turned down when the other end is touched.

As another example, when a webpage is output in an Internet mode, the button member may be scrolled and the displayed icons may be images associated with the scroll. In more detail, the icons may be 'Δ' and 'V' when the input is associated with the scroll (see FIG. 10B).

Referring to FIG. 10C, the icons may change in shape in cooperation with the touch input applied onto the button member. A music-playing mode will be exemplarily illustrated but such case may also be applicable to different modes. As shown in FIG. 10C, in a state that the icons are '+' and '−' associated with the volume adjustment, the rear input unit may sense the adjustment of volume. Under this state, when a push input is applied onto the button member, the icons may be converted into 'rewind', 'play' and 'fast forward', and the rear input unit may be converted to sense an input instructing 'rewind' and 'fast forward'.

Figure 11A:
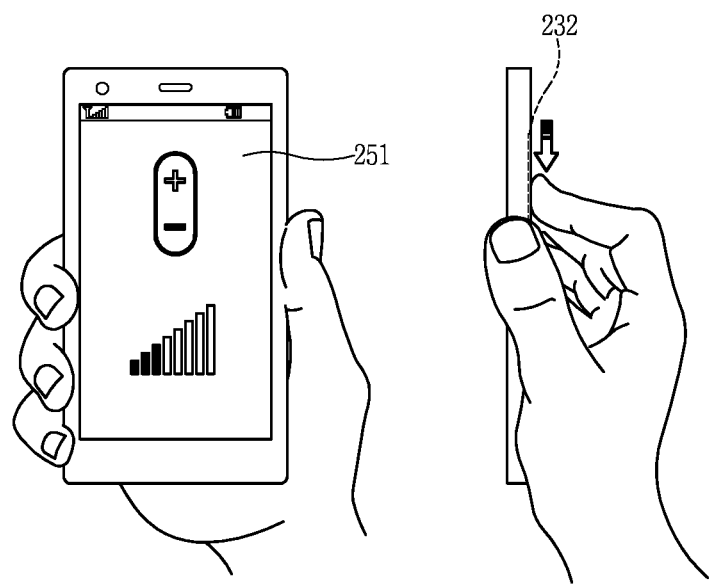
Figure 11B:
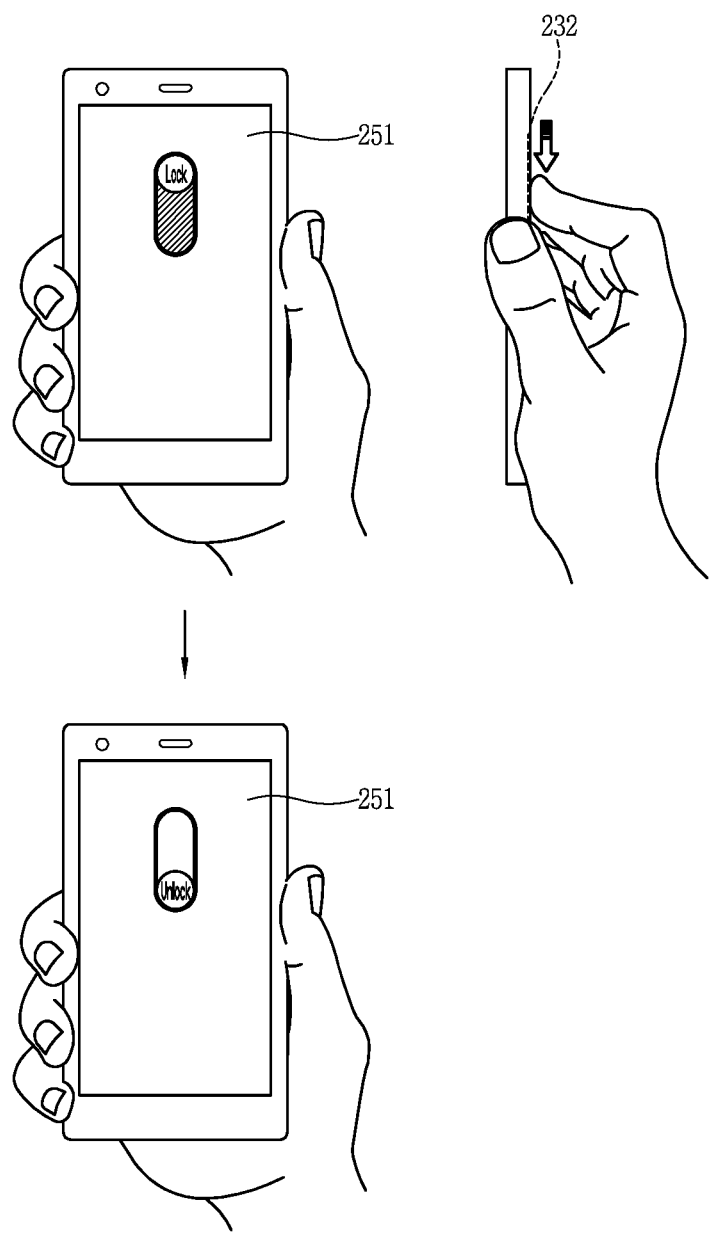
Figure 11C:
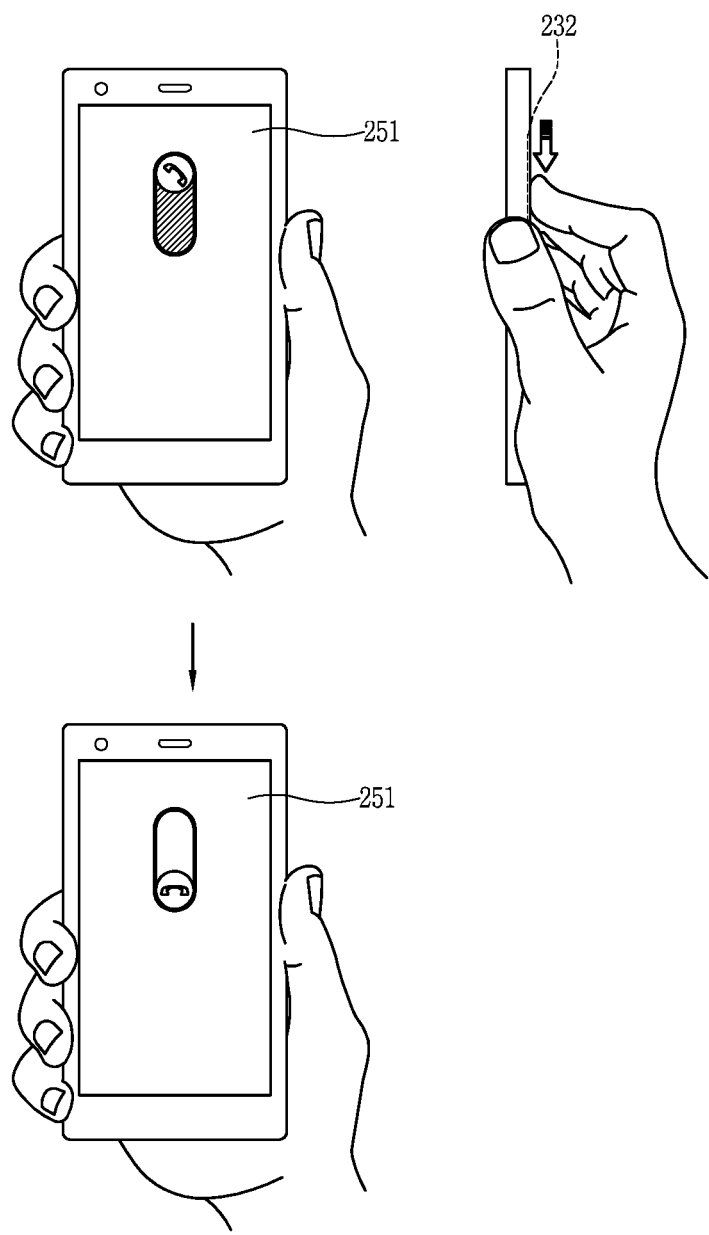

Referring to FIGS. 11A to 11C, the display module may output information indicating an input level of a control command.

For example, the second sensing unit may sense dragging applied onto the button member, and information related to a current (advancing, ongoing) level of the dragging may be output on the display module. In more detail, the controller of the terminal may execute one function in response to the dragging, and the display module may output information indicating a process that the one function is being executed according to the current level of the dragging.

Referring to FIG. 11A, in case of a volume adjustment, an indicator that a magnitude of volume is varied as the dragging is ongoing may be output.

As another example, referring to FIG. 11B, an icon which moves in response to dragging may be output within the button image. Unlocking may be going on as the button member is dragged in a locking mode, and the moving level of the icon may be cooperative with the ongoing level of the unlocking. This may allow a user to recognize the process that the unlocking is being executed. Moving the icon may also be applied in different forms.

For example, referring to FIG. 11C, when a call is incoming, a command for connecting the call may be input in response to dragging of the button member. The user may recognize the process that the incoming of the call is being advanced into the connecting of the call, based on the moving of the icon.

Figure 12:
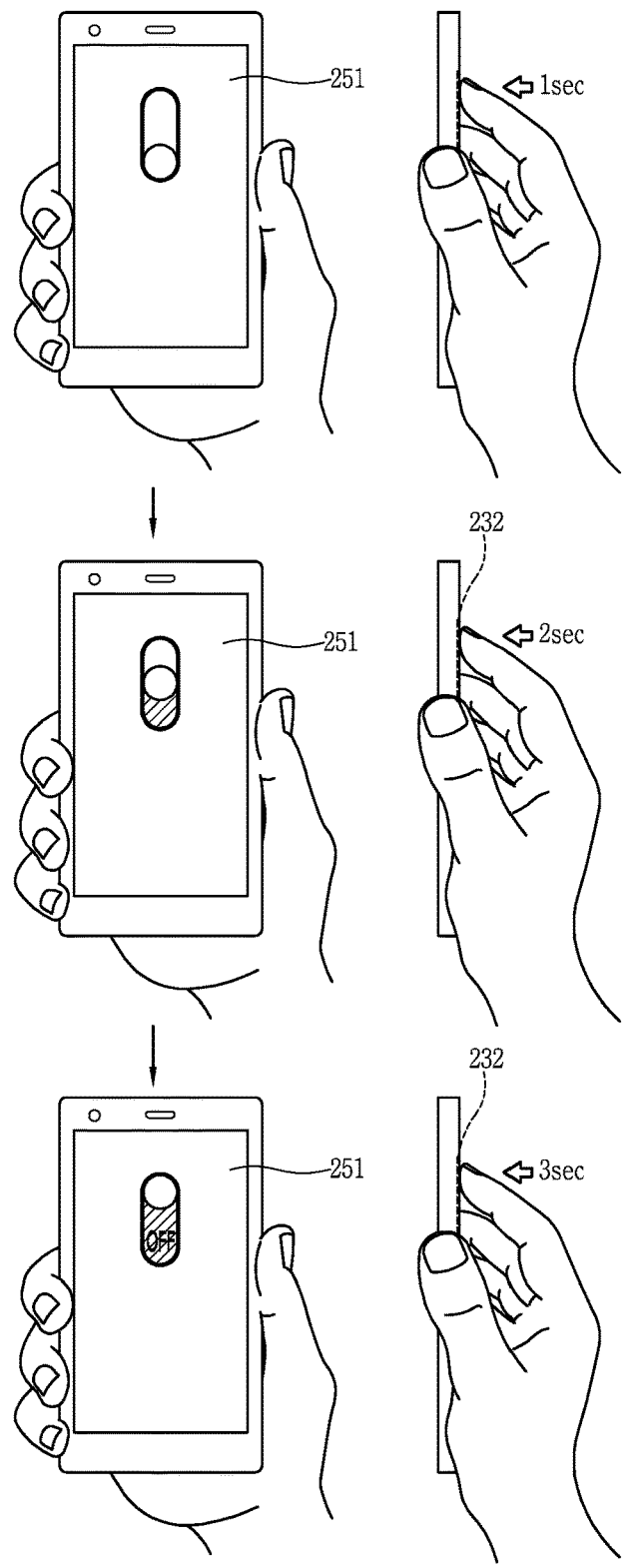

Referring to FIG. 12, the display module may output information related to a duration (holding time) of a push input.

The controller may generate a control command based on a holding time of a push input applied onto the button member, and the display module may output information which is variable according to the holding time.

For example, in case where the terminal is powered off in response to a push input, an icon may be moving as the push input is applied. When the push input applied is continued until a preset time, the icon may be moved down to an end of the button image, and accordingly the power-off command may be executed.

As such, an icon within the user interfaces may be varied into various representations. For example, a user interface applied in a camera mode may be implemented. That is, in a state that a preview screen is output on the display module in the camera mode, capturing may not be executed as soon as the button member being pushed, but an icon is continuously moved for a holding time of the push input and then capturing is executed when the icon arrives at an end of a button image.

Figure 13:
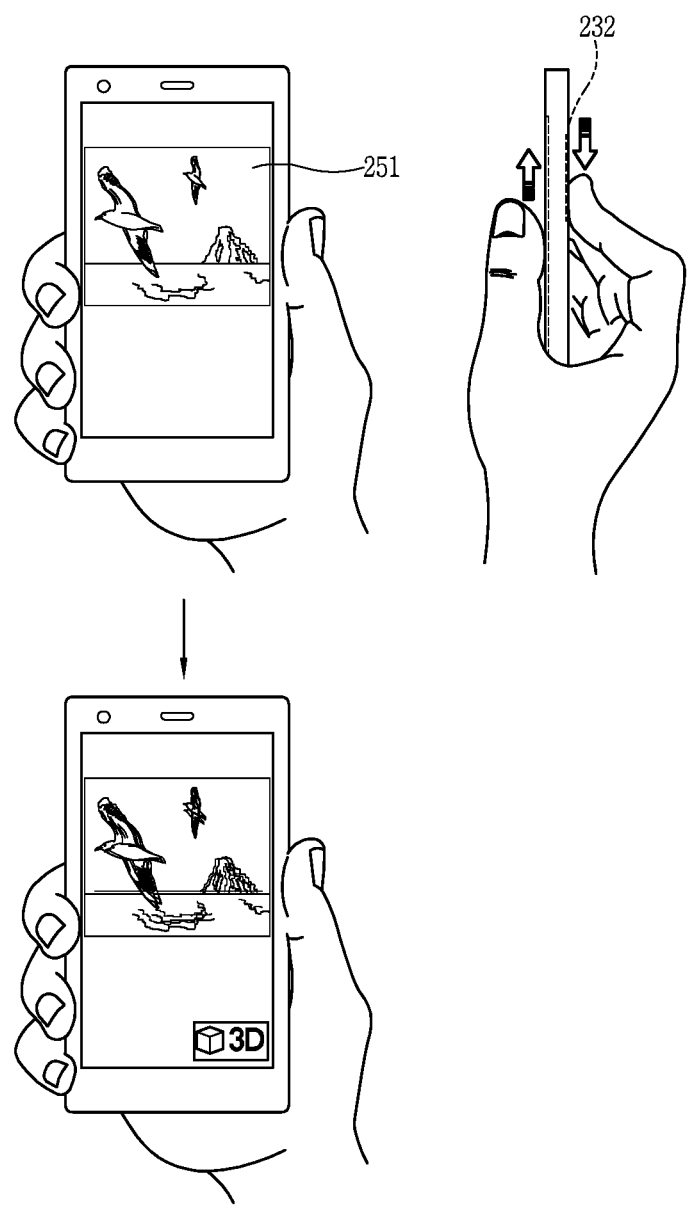
Figure 14A:
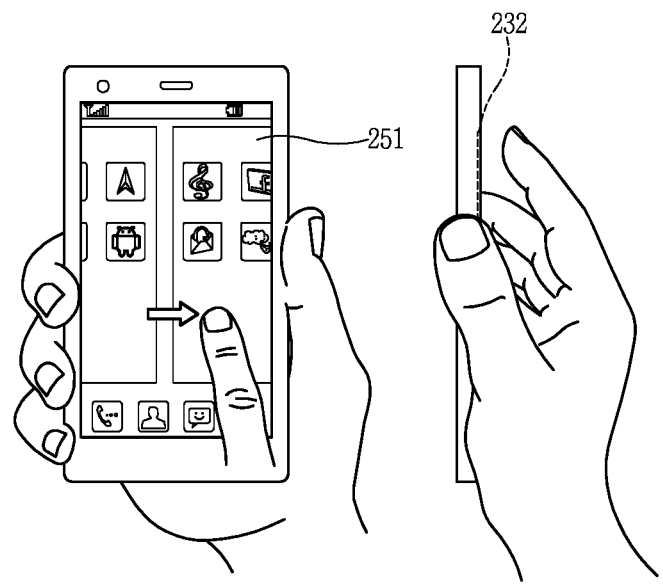
Figure 14B:
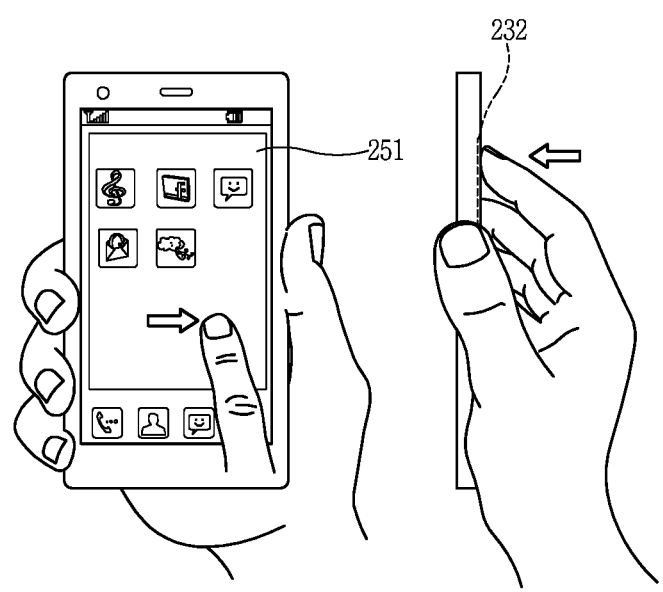

FIGS. 13 to 14B show user interfaces related to a case where touch inputs are simultaneously applied onto the display module and the rear input unit. In this case, the controller may generate a control command in response to the touch inputs simultaneously applied onto the display module and the rear input unit.

For example, referring to FIG. 13, when the display module and the rear input unit are dragged in opposite directions, an image output on the display module may rotate along the dragging direction. With the image rotating, a two-dimensional (2D) image may be converted into a three-dimensional (3D) image.

As another example, referring to FIGS. 14A and 14B, when inputs are applied onto both the display module and the rear input unit, one of the inputs may play a role of restricting the other input. More concretely, referring to FIG. 14A, in a non-pushed or non-touched state of the rear input unit, a drag input onto the display module may be enabled. However, referring to FIG. 14B, in a pushed or touched state of the rear input unit, a touch input onto the display module may be restricted. For example, even if dragging or flicking is executed with respect to the display module in the state that the rear input unit has been touched, such dragging or flicking may not be processed. This cooperative relation may result in preventing the display module from being erroneously manipulated.

The present disclosure may implement various manipulations with minimal elements in a mobile terminal, by virtue of a rear input unit, which is implemented to receive a control command in a touching manner and a pushing manner. This may result in implementation of new types of user interfaces.

In accordance with the present disclosure, as the rear input unit is disposed on a rear surface of the terminal, the front display module may be formed with a larger screen. Also, the structure that a push type sensing unit is disposed at front of a touch type sensing unit may allow for realizing a rear input unit, which is decided as a touch type and a push type according to the overlapped structure of the sensing units or a position where a button is pressed.

The foregoing embodiments and advantages of a mobile terminal are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a bar-type terminal body having a front side and a rear side;
a mobile communication module transmitting and receiving a wireless signal;
a touch screen disposed at the front side of the bar-type terminal body, the touch screen including a display module for displaying information and a front touch sensor for sensing a front touch input;
a battery disposed in the bar-type terminal body;
a cover disposed at the rear side of the bar-type terminal body and covering the battery, the cover having a first through hole and a second through hole;
a front camera disposed at the front side of the bar-type terminal body;
a rear camera disposed in the first through hole of the cover at the rear side of the bar-type terminal body;
a rear input unit provided at the rear side of the bar-type terminal body, the rear input unit including a button member disposed at the second through hole of the cover and a rear touch sensor for sensing a rear touch input applied to the button member;
one or more processors; and
a memory storing one or more programs configured to be executed by the one or more processors,
wherein the front side of the bar-type terminal body is absent any manipulation button for inputting a control command except for the touch screen,
wherein a position of the rear input unit is overlapped with a position of the touch screen and is disposed laterally between the rear camera and the battery, wherein in response to receiving the rear touch input via the rear input unit, the one or more processors process the rear touch input as a control command for different functions according to information output to the touch screen, wherein a first function of the different functions releases a locked state of the mobile terminal in response to a first rear touch input applied to the rear touch sensor in a first state that a lock screen is displayed on the touch screen, wherein a second function of the different functions connects an incoming call in response to a second rear touch input applied to the rear touch sensor in a second state that the incoming call is received on the mobile terminal, and wherein a third function of the different functions captures an image through at least one of the front camera and the rear camera in response to a third rear touch input applied to the rear touch sensor in a third state that a camera preview is displayed on the touch screen.

2. The mobile terminal of claim 1, wherein a fourth function of the different functions scrolls a webpage in response to a fourth rear touch input applied to the rear touch sensor in a fourth state that the webpage is displayed on the touch screen.

3. The mobile terminal of claim 1, wherein a fifth function of the different functions controls a music-playing in response to a fifth rear touch input applied to the rear touch sensor in a fifth state that a music is playing on the mobile terminal.

4. The mobile terminal of claim 1, wherein the rear input unit is formed on the cover.

5. The mobile terminal of claim 1, further comprising:
a supporting member supporting the rear input unit, the supporting member provided at the bar-type terminal body and overlapping at least a part of the rear input unit to support the rear input unit.

6. The mobile terminal of claim 1, further comprising:
a rear touch controller configured to:
process a signal generated by the rear touch input on the rear touch sensor, and
transmit a data corresponding to the signal generated by the rear touch input to the one or more processors.

7. The mobile terminal of claim 1, wherein the display module includes a Liquid Crystal Display (LCD), and
wherein the display module and the front touch sensor are formed as an interlayer structure.

8. The mobile terminal of claim 1, wherein the display module includes an Organic Light Emitting Diode (OLED) display, and
wherein the display module and the front touch sensor are formed as an interlayer structure.

9. A mobile terminal comprising:
a bar-type terminal body having a front side and a rear side;
a mobile communication module transmitting and receiving a wireless signal;
a touch screen disposed at the front side of the bar-type terminal body, the touch screen including a display module for displaying information and a front touch sensor for sensing a front touch input;
a battery disposed in the bar-type terminal body;
a cover disposed at the rear side of the bar-type terminal body and covering the battery, the cover having a first through hole and a second through hole;
a front camera disposed at the front side of the bar-type terminal body;
a rear camera disposed in the first through hole of the cover at the rear side of the bar-type terminal body;
a rear input unit provided at the rear side of the bar-type terminal body, the rear input unit including a button member disposed at the second through hole of the cover and a rear touch sensor for sensing a rear touch input applied to the button member;
one or more processors; and
a memory storing one or more programs configured to be executed by the one or more processors,
wherein the front side of the bar-type terminal body is absent any manipulation button for inputting a control command except for the touch screen,
wherein a position of the rear input unit is overlapped with a position of the touch screen and is disposed laterally between the rear camera and the battery,
wherein in response to receiving the rear touch input via the rear input unit, the one or more processors process the rear touch input as a control command for different functions according to information output to the touch screen,
wherein a first function of the different functions releases a locked state of the mobile terminal in response to a first rear touch input applied to the rear touch sensor in a first state that a lock screen is displayed on the touch screen,
wherein a second function of the different functions connects an incoming call in response to a second rear touch input applied to the rear touch sensor in a second state that the incoming call is received on the mobile terminal,
wherein a third function of the different functions captures an image through at least one of the front camera and the rear camera in response to a third rear touch input applied to the rear touch sensor in a third state that a camera preview is displayed on the touch screen,
wherein a fourth function of the different functions scrolls a webpage in response to a fourth rear touch input applied to the rear touch sensor in a fourth state that the webpage is displayed on the touch screen, and
wherein a fifth function of the different functions controls a music-playing in response to a fifth rear touch input applied to the rear touch sensor in a fifth state that a music is playing on the mobile terminal.

10. The mobile terminal of claim 9, wherein the rear input unit is formed on the cover.

11. The mobile terminal of claim 9, further comprising:
a supporting member supporting the rear input unit, the supporting member provided at the bar-type terminal body and overlapping at least a part of the rear input unit to support the rear input unit.

12. The mobile terminal of claim 9, further comprising:
a rear touch controller configured to:
process a signal generated by the rear touch input on the rear touch sensor, and
transmit a data corresponding to the signal generated by the rear touch input to the one or more processors.

13. The mobile terminal of claim 9, wherein the display module includes a Liquid Crystal Display (LCD), and
wherein the display module and the front touch sensor are formed as an interlayer structure.

14. The mobile terminal of claim 9, wherein the display module includes an Organic Light Emitting Diode (OLED) display, and
wherein the display module and the front touch sensor are formed as an interlayer structure.

15. A mobile terminal comprising:
a bar-type terminal body having a front side and a rear side;
a mobile communication module transmitting and receiving a wireless signal;
a touch screen disposed at the front side of the bar-type terminal body, the touch screen including a display module for displaying information and a front touch sensor for sensing a front touch input;
a battery disposed in the bar-type terminal body;
a cover disposed at the rear side of the bar-type terminal body and covering the battery, the cover having a first through hole and a second through hole;
a front camera disposed at the front side of the bar-type terminal body;
a rear camera disposed in the first through hole of the cover at the rear side of the bar-type terminal body;
a rear input unit provided at the rear side of the bar-type terminal body, the rear input unit including a button member disposed at the second through hole of the cover and a rear touch sensor for sensing a rear touch input applied to the button member;
one or more processors; and
a memory storing one or more programs configured to be executed by the one or more processors,
wherein the front side of the bar-type terminal body is absent any manipulation button for inputting a control command except for the touch screen,
wherein a position of the rear input unit is overlapped with a position of the touch screen and is disposed laterally between the rear camera and the battery,
wherein in response to receiving the rear touch input via the rear input unit, the one or more processors process the rear touch input as a control command for different functions according to information output to the touch screen,
wherein a first function of the different functions releases a locked state of the mobile terminal in response to a first rear touch input applied to the rear touch sensor in a first state that a lock screen is displayed on the touch screen,
wherein a third function of the different functions captures an image through at least one of the front camera and the rear camera in response to a third rear touch input applied to the rear touch sensor in a third state that a camera preview is displayed on the touch screen, and
wherein a fourth function of the different functions scrolls a webpage in response to a fourth rear touch input applied to the rear touch sensor in a fourth state that the webpage is displayed on the touch screen.

16. The mobile terminal of claim 15, wherein a second function of the different functions connects an incoming call in response to a second rear touch input applied to the rear touch sensor in a second state that the incoming call is received on the mobile terminal.

17. The mobile terminal of claim 15, wherein a fifth function of the different functions controls a music-playing in response to a fifth rear touch input applied to the rear touch sensor in a fifth state that a music is playing on the mobile terminal.

18. The mobile terminal of claim 15, wherein the rear input unit is formed on the cover.

19. The mobile terminal of claim 15, further comprising:
a supporting member supporting the rear input unit, the supporting member provided at the bar-type terminal body and overlapping at least a part of the rear input unit to support the rear input unit.

20. The mobile terminal of claim 15, further comprising:
a rear touch controller configured to:
process a signal generated by the rear touch input on the rear touch sensor, and
transmit a data corresponding to the signal generated by the rear touch input to the one or more processors.

21. The mobile terminal of claim 15, wherein the display module includes a Liquid Crystal Display (LCD), and
wherein the display module and the front touch sensor are formed as an interlayer structure.

22. The mobile terminal of claim 15, wherein the display module includes an Organic Light Emitting Diode (OLED) display, and
wherein the display module and the front touch sensor are formed as an interlayer structure.

23. A mobile terminal comprising:
a bar-type terminal body having a front side and a rear side;
a mobile communication module transmitting and receiving a wireless signal;
a touch screen disposed at the front side of the bar-type terminal body, the touch screen including a display module for displaying information and a front touch sensor for sensing a front touch input;
a battery disposed in the bar-type terminal body;
a cover disposed at the rear side of the bar-type terminal body and covering the battery, the cover having a first through hole and a second through hole;
a front camera disposed at the front side of the bar-type terminal body;
a rear camera disposed in the first through hole of the cover at the rear side of the bar-type terminal body;
a rear input unit provided at the rear side of the bar-type terminal body, the rear input unit including a button member disposed at the second through hole of the cover and a rear touch sensor for sensing a rear touch input applied to the button member;
one or more processors; and
a memory storing one or more programs configured to be executed by the one or more processors,
wherein the front side of the bar-type terminal body is absent any manipulation button for inputting a control command except for the touch screen,
wherein a position of the rear input unit is overlapped with a position of the touch screen and is disposed laterally between the rear camera and the battery,
wherein in response to receiving the rear touch input via the rear input unit, the one or more processors process the rear touch input as a control command for different functions according to information output to the touch screen,
wherein a first function of the different functions releases a locked state of the mobile terminal in response to a first rear touch input applied to the rear touch sensor in a first state that a lock screen is displayed on the touch screen,
wherein a third function of the different functions captures an image through at least one of the front camera and the rear camera in response to a third rear touch input applied to the rear touch sensor in a third state that a camera preview is displayed on the touch screen, and
wherein a fifth function of the different functions controls a music-playing in response to a fifth rear touch input applied to the rear touch sensor in a fifth state that a music is playing on the mobile terminal.

24. The mobile terminal of claim 23, wherein a second function of the different functions connects an incoming call in response to a second rear touch input applied to the rear touch sensor in a second state that the incoming call is received on the mobile terminal.

25. The mobile terminal of claim 23, wherein a fourth function of the different functions scrolls a webpage in response to a fourth rear touch input applied to the rear touch sensor in a fourth state that the webpage is displayed on the touch screen.

26. The mobile terminal of claim 23, wherein the rear input unit is formed on the cover.

27. The mobile terminal of claim 23, further comprising:
a supporting member supporting the rear input unit, the supporting member provided at the bar-type terminal body and overlapping at least a part of the rear input unit to support the rear input unit.

28. The mobile terminal of claim 23, further comprising:
a rear touch controller configured to:
process a signal generated by the rear touch input on the rear touch sensor, and
transmit a data corresponding to the signal generated by the rear touch input to the one or more processors.

29. The mobile terminal of claim 23, wherein the display module includes a Liquid Crystal Display (LCD), and
wherein the display module and the front touch sensor are formed as an interlayer structure.

30. The mobile terminal of claim 23, wherein the display module includes an Organic Light Emitting Diode (OLED) display, and
wherein the display module and the front touch sensor are formed as an interlayer structure.

* * * * *